United States Patent
Brussaard et al.

(10) Patent No.: US 12,050,392 B2
(45) Date of Patent: Jul. 30, 2024

(54) WAVEGUIDES AND MANUFACTURING METHODS THEREOF

(71) Applicant: ASML NETHERLANDS B.V., Veldhoven (NL)

(72) Inventors: Gerrit Jacobus Hendrik Brussaard, Boxtel (NL); Johannes Richard Karl Kohler, Fürth (DE)

(73) Assignee: ASML NETHERLANDS B.V., Veldhoven (NL)

( * ) Notice: Subject to any disclaimer, the term of this patent is extended or adjusted under 35 U.S.C. 154(b) by 64 days.

(21) Appl. No.: 18/072,196

(22) Filed: Nov. 30, 2022

(65) Prior Publication Data

US 2023/0194954 A1 Jun. 22, 2023

(30) Foreign Application Priority Data

Dec. 22, 2021 (EP) .................................. 21217158

(51) Int. Cl.
*G02F 1/365* (2006.01)
*G02F 1/35* (2006.01)

(52) U.S. Cl.
CPC ............ *G02F 1/365* (2013.01); *G02F 1/3528* (2021.01)

(58) Field of Classification Search
None
See application file for complete search history.

(56) References Cited

U.S. PATENT DOCUMENTS

| | | | |
|---|---|---|---|
| 6,952,253 B2 | 10/2005 | Lof et al. | |
| 10,859,889 B2* | 12/2020 | Zia | G02B 6/24 |
| 11,099,319 B2 | 8/2021 | Uebel et al. | |
| 11,846,867 B2* | 12/2023 | Ravensbergen | G06F 30/398 |
| 2017/0160467 A1 | 6/2017 | Poletti et al. | |
| 2021/0141150 A1 | 5/2021 | Sabert et al. | |
| 2021/0215872 A1 | 7/2021 | Sabert et al. | |
| 2023/0194954 A1* | 6/2023 | Brussaard | G02F 1/3528 385/122 |

(Continued)

FOREIGN PATENT DOCUMENTS

| | | |
|---|---|---|
| EP | 3136143 | 3/2017 |
| TW | 202105067 | 2/2021 |

(Continued)

OTHER PUBLICATIONS

R. Pennetta, et al., "Fabrication and non-destructive characterization of tapered single-ring hollow-core photonic crystal fiber," APL Photonics 4(5):056105 (2019).

(Continued)

*Primary Examiner* — Rhonda S Peace

(74) *Attorney, Agent, or Firm* — Pillsbury Winthrop Shaw Pittman, LLP

(57) ABSTRACT

A waveguide including: a first section, the first section configured to generate, by a non-linear optical process, a broadened wavelength spectrum of pulsed radiation provided to an input end of the waveguide; a second section, the second section including an output end of the waveguide, the second section configured to exhibit a larger absolute value of group velocity dispersion than the first section; wherein a length of the second section is configured to reduce a peak intensity of one or more peaks in the broadened wavelength spectrum by at least 20%.

20 Claims, 10 Drawing Sheets

(56) References Cited

U.S. PATENT DOCUMENTS

2024/0004319 A1* 1/2024 Uebel ................. G03F 7/70616
2024/0152024 A1* 5/2024 Pongers ................. G02F 1/3528

FOREIGN PATENT DOCUMENTS

WO 2018/127266 7/2018
WO 2022/122325 6/2022

OTHER PUBLICATIONS

E. A. J. Marcatili et al., "Hollow Metallic and Dielectric Waveguides for Long Distance Optical Transmission and Lasers," Bell Syst. Tech. J. 43, 1783 (1964).
European Search Report dated May 19, 2022, issued in corresponding European Application No. 21217158, pp. 1-2.

* cited by examiner

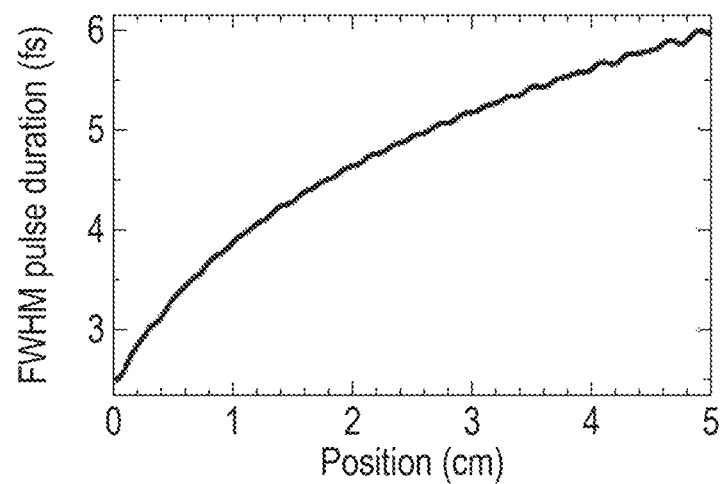
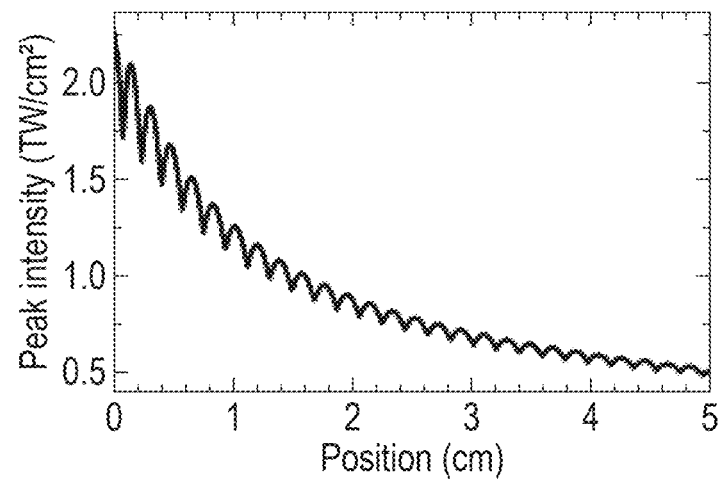
FIG. 8

900

Forming a first section of the waveguide, the first section being configured to broaden, by a non-linear optical process, a wavelength spectrum of pulsed radiation provided to an input end of the waveguide.
(S901)

Forming a second section of the waveguide, the second section comprising an output end of the waveguide, the second section being configured to exhibit normal group velocity dispersion, wherein a length of the second section is configured to reduce a peak intensity of one or more peaks in the broadened wavelength spectrum by at least 20%.
(S902)

FIG. 9

WAVEGUIDES AND MANUFACTURING METHODS THEREOF

This application claims priority to European Patent Application No. 21217158.1, filed Dec. 22, 2021, which is incorporated herein in its entirety by reference.

FIELD

The present description relates to waveguides, such as optical fibers.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD=k_1 \times \lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low k1.

In the field of lithography, many measurement systems may be used, both within a lithographic apparatus and external to a lithographic apparatus. Generally, such a measurements system may use a radiation source to irradiate a target with radiation, and a detection system operable to measure at least one property of a portion of the incident radiation that scatters from the target. An example of a measurement system that is external to a lithographic apparatus is an inspection apparatus or a metrology apparatus, which may be used to determine properties of a pattern previously projected onto a substrate by the lithographic apparatus. Such an external inspection apparatus may, for example, comprise a scatterometer. Examples of measurement systems that may be provided within a lithographic apparatus include: a topography measurement system (also known as a level sensor); a position measurement system (for example an interferometric device) for determining position of a reticle or wafer stage; and an alignment sensor for determining a position of an alignment mark. These measurement devices may use electromagnetic radiation to perform the measurement.

Different types of radiation may be used to interrogate different types of properties of a pattern. Some measurements system may use a broadband radiation source. Such a broadband radiation source may be a supercontinuum source and may comprise a waveguide (for example, an optical fiber) having a non-linear medium through which a pulsed pump radiation beam is propagated to broaden a spectrum of the radiation.

SUMMARY

One challenge associated with implementing such a supercontinuum source is the lifetime of the waveguide, and one factor that can severely limit the lifetime of the waveguide is damage that can occur when radiation exits the waveguide due to the high peak intensities of the broadened radiation spectrum.

In the case of an optical fiber, damage at the exit can take the form of deposited particles of fiber material that are produced by ionization, resulting in glassy structures "growing" at the output of the fiber due to sputtering. Without wishing to be bound by theory, for the example of a hollow core photonic crystal fiber (HC-PCF), typically comprising fused silica glass and filled with a non-linear optical medium in the form of a gas such as that described in PCT Patent Application Publication No. WO2018127266, which is incorporated herein in its entirety by reference, such damage may be caused by ionization of the gas induced by the intense pump radiation. The ions that are produced may etch the glass, and the etched glass may then redeposit preferentially at edges and protrusions. The density of such edges and protrusions may be particularly high at the end of the fiber due to the fact that the fiber will have been produced by a cleaving process, which introduces defect centers and structural flaws. In addition, inside the fiber, the plasma is constrained, meaning that the electrons that are produced in the ionization process will recombine quickly at nearby walls. However, at the exit of the fiber, the electrons are unconstrained and form a plasma with a higher density of free electrons, which in turn can absorb more power from the radiation pulses propagating through the plasma. This has an amplifying effect that leads to more plasma, and consequentially more etching of the fiber and further redeposition of the etched glass.

It may therefore be desirable to provide an alternative waveguide (for example an optical fiber) for receiving input radiation and broadening a frequency range of the input radiation so as to provide (broadband) output radiation that at least partially addresses one or more problems associated with the prior art whether identified herein or otherwise.

In an aspect, there is provided a waveguide comprising: a first section, the first section being configured to generate, by a non-linear optical process, a broadened wavelength spectrum of pulsed radiation provided to an input end of the waveguide; a second section, the second section comprising an output end of the waveguide, the second section being configured to exhibit a larger absolute value of group velocity dispersion than the first section; wherein a length of the second section is between 0.5 cm and 20 cm and configured to reduce a peak intensity of one or more peaks in the broadened wavelength spectrum by at least 20%.

Advantageously, reducing the peak intensity of one or more peaks in the broadened wavelength spectrum may lead to reduced damage at the output end of the waveguide caused by the intense peaks. Reducing the damage caused by individual spectral peaks advantageously increases the number of spectral peaks that can pass through the output of the waveguide before the waveguide is damaged to the point that it is no longer usable, thereby increasing the overall lifetime of the waveguide.

In some examples, the peak intensity of the one or more peaks in the broadened wavelength spectrum may be reduced even further by the second section of the waveguide, for example by 25%, 50%, or even 75%.

In some examples, the waveguide may be an optical fiber, for example a hollow core optical fiber such as a hollow core photonic crystal fiber (HC-PCF). In embodiments where the waveguide is a HC-PCF, the second section may be configured to exhibit normal group velocity dispersion. In some examples, the waveguide may be a solid core optical fiber.

It will be appreciated that the first section of the waveguide may be configured to generate a broadened wavelength spectrum by an interaction between the pulsed radiation provided to the input end of the waveguide and a non-linear medium inside the waveguide. In some examples, the non-linear medium may be a gas. In some examples, generating the broadened wavelength spectrum may comprise one or more selected from: four-wave mixing, modulation instability, ionization of the working gas, Raman effects, Kerr nonlinearity, soliton formation, soliton fission, and/or soliton self-compression.

It will be understood that "normal dispersion" corresponds to a regime of positive group velocity dispersion, also represented as $\beta 2$. In some examples, the first section of the waveguide is configured to exhibit "anomalous dispersion", i.e. negative group velocity dispersion ($\beta_2$). It will be further understood that the peak intensity of the peaks in the broadened wavelength spectrum generally decreases over the length of the second section as the peaks propagate through the second section of the waveguide. It will be understood that the decrease in the intensity of the peaks is caused by the stretching of the peaks in time due to the normal dispersion of the second section.

In some examples, the waveguide comprises a core extending axially along the first and second sections of the waveguide, wherein a diameter of the core in the second section is greater than a diameter of the core in the first section. The core diameter may alternatively be referred to as an inner diameter of the waveguide.

The changing core diameter between the first and second sections of the waveguide advantageously changes the dispersive properties of the waveguide in relation to the propagating radiation pulse such that the pulses are stretched in time and the peak intensities are reduced.

In some examples, the diameter of the core in the second section is constant over the length of the second section. Advantageously, a waveguide comprising a second section having a constant core diameter over its length may be straightforward to manufacture. For example, where the waveguide is an optical fiber, the first and second sections of the waveguide may be formed by attaching two pieces of optical fiber together.

In some examples, the diameter of the core in the second section increases with increasing distance from the first section over at least a portion of the second section. For example, the second section may include upwardly-tapered section(s).

Since the peak intensity of the peaks in the broadened spectrum scale with the inverse square of the inner (core) diameter of the waveguide, even a weakly upwardly-tapered second section would advantageously lead to strongly reduced peak intensity, resulting in further improvements in the lifetime of the waveguide.

In some examples, the waveguide further comprises a plurality of anti-resonant elements surrounding the core in the first section. It will be understood that the anti-resonant elements serve to confine radiation that propagates through the waveguide and to guide the radiation along the waveguide. The anti-resonant elements may further serve to suppress coupling of the fundamental optical mode to higher order optical modes, thus reducing losses in the waveguide. In some examples, the anti-resonant elements may be capillaries.

In some examples, the plurality of anti-resonant elements may surround the core in at least a portion of the second section, and a cross-sectional area of each of the anti-resonant elements may decrease in the second section with increasing distance from the first section. For example, the anti-resonant elements may be collapsed over at least a portion of the length of the second section of the waveguide.

It will be appreciated that the decreasing cross-sectional area of the anti-resonant elements may correspond to an alternative form of an upwardly-tapered inner diameter of the waveguide. Advantageously, a second section comprising anti-resonant elements having decreasing cross-sectional area may be straightforwardly manufactured, for example by heating and stretching an existing portion of waveguide comprising anti-resonant elements.

In some examples, the cross-sectional area of the anti-resonant elements may decrease over at least a portion of the length of the second section at a rate that is sufficient to meet the adiabaticity criterion, thus preventing coupling of the fundamental optical mode to higher-order modes that would otherwise occur as a result of a sudden change in inner waveguide diameter and would cause losses in the waveguide.

In some examples, the first section may comprise a plurality of anti-resonant elements surrounding the core, and the second section may be provided without any anti-resonant elements.

Advantageously, a second section without any anti-resonant elements may be straightforwardly manufactured, for example by attaching a portion of a baseline optical fiber to a portion of an optical fiber having anti-resonant elements.

In an aspect, there is provided a method of manufacturing a waveguide, the method comprising: forming a first section of the waveguide, the first section being configured to broaden, by a non-linear optical process, a wavelength spectrum of pulsed radiation provided to an input end of the waveguide; and forming a second section of the waveguide, the second section comprising an output end of the waveguide, the second section being configured to exhibit a larger absolute value of group velocity dispersion than the first section; wherein a length of the second section is between 0.5 cm and 20 cm and configured to reduce a peak intensity of one or more peaks in the broadened wavelength spectrum by at least 20%.

Advantageously, reducing the peak intensity of one or more peaks in the broadened wavelength spectrum may lead to reduced damage at the output end of the waveguide caused by the intense peaks. Reducing the damage caused by individual spectral peaks advantageously increases the number of spectral peaks that can pass through the output of the waveguide before the waveguide is damaged to the point that it is no longer usable, thereby increasing the overall lifetime of the waveguide.

In some examples, the peak intensity of the one or more peaks in the broadened wavelength spectrum may be reduced even further by the second section of the waveguide, for example by 25%, 50%, or even 75%.

In some examples, the method may be a method of manufacturing a waveguide that is an optical fiber, for example a hollow core optical fiber such as a hollow core photonic crystal fiber (HC-PCF). In embodiments where the waveguide is a HC-PCF, the second section may be configured to exhibit normal group velocity dispersion. In some examples, the method may be applied to manufacturing a waveguide that is a solid core optical fiber.

It will be appreciated that the first section of the waveguide may be configured to generate a broadened wavelength spectrum by an interaction between the pulsed radiation provided to the input end of the waveguide and a non-linear medium inside the waveguide. In some examples, the non-linear medium may be a gas. In some examples, generating the broadened wavelength spectrum may comprise one or more selected from: four-wave mixing, modulation instability, ionization of the working gas, Raman effects, Kerr nonlinearity, soliton formation, soliton fission, and/or soliton self-compression.

It will be understood that "normal dispersion" corresponds to a regime of positive group velocity dispersion, also represented as $\beta_2$. In some examples, the first section of the waveguide is configured to exhibit "anomalous dispersion", i.e. negative group velocity dispersion ($\beta_2$). It will be further understood that the peak intensity of the peaks in the broadened wavelength spectrum generally decreases over the length of the second section as the peaks propagate through the second section of the waveguide. It will be understood that the decrease in the intensity of the peaks is caused by the stretching of the peaks in time due to the normal dispersion of the second section.

In some examples, forming the first and second sections of the waveguide may comprise: receiving a waveguide; and modifying a section of the waveguide comprising the output end of the waveguide. It will be understood that modifying the section of the waveguide that comprises the output end of the waveguide may comprise attaching a further section of waveguide to the output end of the waveguide, and/or making adjustments directly to the output end of the received waveguide.

In some examples, forming the second section of the waveguide may comprise attaching the second section to the first section, for example by splicing the second section to the first section and/or coupling the second section to the first section.

Advantageously, attaching the second section to the first section may enable a simplified manufacturing process, for example whereby the two sections of the waveguide can be manufactured separately according to the specific requirements of the two sections, and then brought together at the end of the manufacturing process.

Alternatively, or in addition, forming the second section of the waveguide may comprise directly adjusting an output end of the received waveguide. For example, in the case of a received waveguide comprising a plurality of anti-resonant elements surrounding a core, directly adjusting the output end of the received waveguide may comprise collapsing the anti-resonant elements to form the second section.

In some examples, the first and second sections of the waveguide may comprise a plurality of anti-resonant elements surrounding a core, and forming the second section may comprise collapsing the plurality of anti-resonant elements in the second section.

In some examples, collapsing the plurality of anti-resonant elements in the second section may comprise: heating the second section; and elongating the second section by applying a pulling force.

Advantageously, collapsing the anti-resonant elements in the second section enables forming the first and second sections from a single existing piece of a waveguide comprising anti-resonant elements.

BRIEF DESCRIPTION OF THE DRAWINGS

Embodiments will now be described, by way of example only, with reference to the accompanying schematic drawings, in which:

FIG. 8 illustrates, as a numerically simulated example, the evolution of (a) full-width half-maximum pulse duration and (b) peak intensity of a 2.5 fs long peak of energy ~50 nJ, propagating along a 5 cm long section of a hollow core optical fiber with no anti-resonant elements;

FIG. 9 illustrates a method for manufacturing a waveguide according to an embodiment;

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm). <Reticle>

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective, binary, phase-shifting, hybrid, etc.), examples of other such patterning devices include a programmable mirror array and a programmable LCD array.

Figure 1:
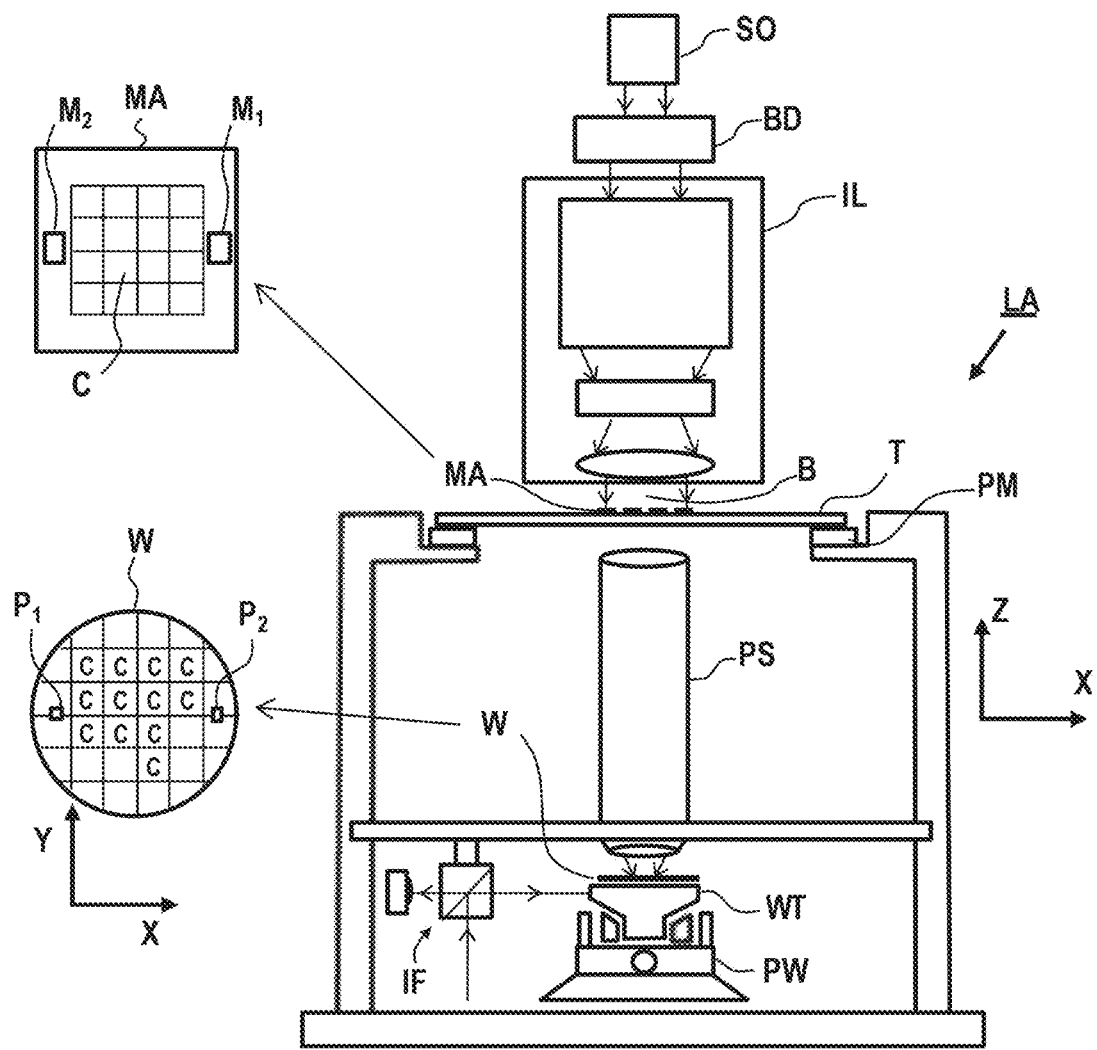
FIG. 1 depicts a schematic overview of a lithographic apparatus.

FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a mask support (e.g., a mask table) MT constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein in its entirety by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support MT, and is patterned by the pattern (design layout) present on patterning device MA. Having traversed the mask MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using mask alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

Figure 2:
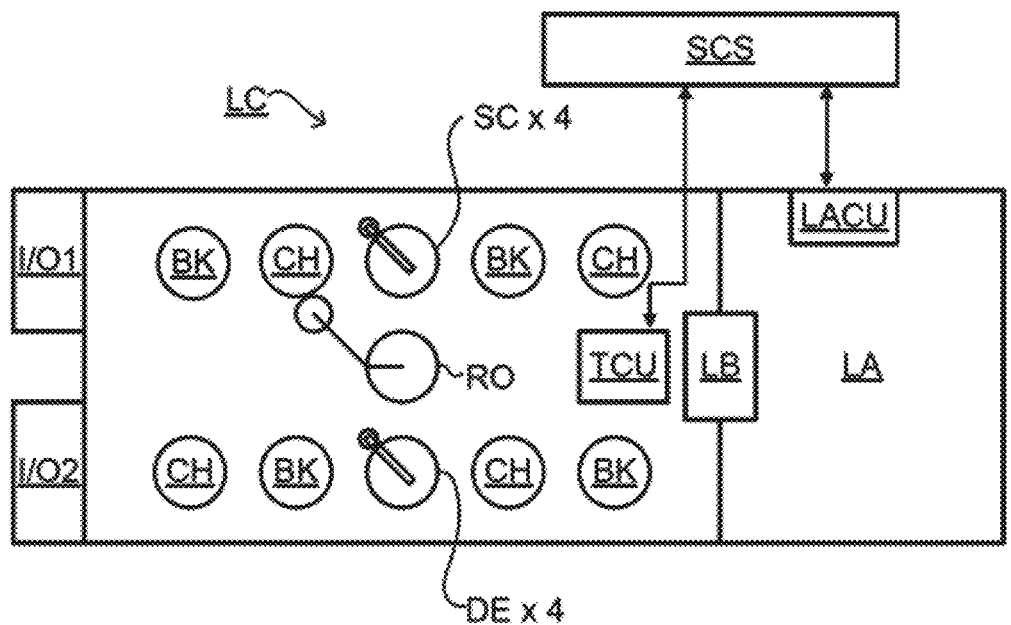
FIG. 2 depicts a schematic overview of a lithographic cell.

As shown in FIG. 2 the lithographic apparatus LA may form part of a lithographic cell LC, also sometimes referred to as a lithocell or (litho)cluster, which often also includes apparatus to perform pre- and post-exposure processes on a substrate W. Conventionally these include spin coaters SC to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W, and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 3:
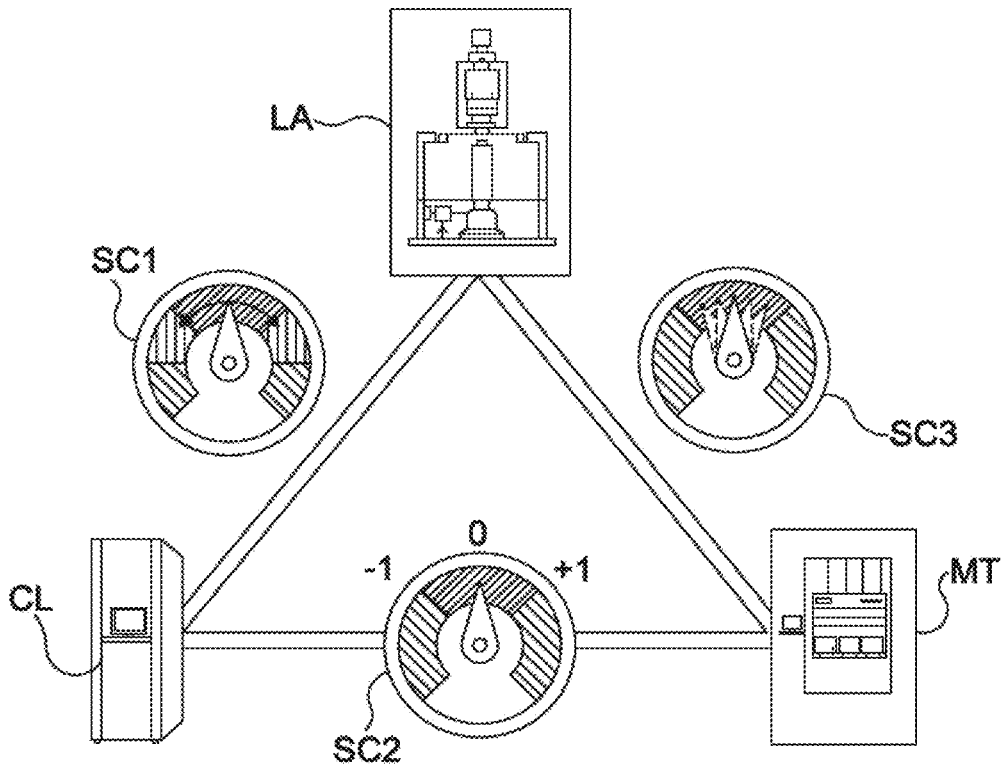
FIG. 3 depicts a schematic representation of holistic lithography, representing a cooperation between three technologies to optimize semiconductor manufacturing.

Typically the patterning process in a lithographic apparatus LA is one of the most critical steps in the processing which requires high accuracy of dimensioning and placement of structures on the substrate W. To ensure this high accuracy, three systems may be combined in a control environment as schematically depicted in FIG. 3. One of these systems is the lithographic apparatus LA which is (virtually) connected to a metrology tool MT (a second system) and to a computer system CL (a third system). A feature of such an environment is to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) the design layout to be patterned to predict which resolution enhancement techniques to use and to perform computational lithography simulations and calculations to determine which mask layout and lithographic apparatus settings achieve the largest overall process window of the patterning process (depicted in FIG. 3 by the double arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 3 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

The metrology tool MT (for example a scatterometer, topography measurement system, or position measurement system) may use radiation originating from a radiation source to perform a measurement. The properties of the radiation used by a metrology tool may affect the type and quality of measurements that may be performed. For some applications, it may be advantageous to use multiple radiation frequencies to measure a substrate, for example broadband radiation may be used. Multiple different frequencies may be able to propagate, irradiate, and scatter off a metrology target with no or minimal interference with other frequencies. Therefore different frequencies may for example be used to obtain more metrology data simultaneously. Different radiation frequencies may also be able to interrogate and discover different properties of a metrology target. Broadband radiation may be useful in metrology systems MT such as for example level sensors, alignment mark measurement systems, scatterometry tools, or inspection tools. A broadband radiation source may be a supercontinuum source.

One method for generating broadband radiation may be to broaden high-power narrow band or single frequency input radiation, for example making use of non-linear, higher order effects. The input radiation (which may be produced using a laser) may be referred to as pump radiation. To obtain high power radiation for broadening effects, radiation may be confined into a small area (such as in a waveguide) so that strongly localized high intensity radiation is achieved. In those areas, the radiation may interact with broadening structures and/or materials forming a non-linear medium so as to create broadband output radiation. In the high intensity radiation areas, different materials and/or structures may be used to enable and/or improve radiation broadening by providing a suitable non-linear medium.

As described above, there are many nonlinear optical processes involved in generation of broadband output radiation (e.g., supercontinuum or white light). Which nonlinear optical process has a more pronounced spectral broadening effect over the others will depend on how the operating parameters are set. For example, by selecting a pump wavelength and/or a waveguide such that the pump pulse propagates through the waveguide in a normal dispersion region (positive group velocity dispersion (GVD), represented by $\beta_2$), self-phase modulation is the dominant nonlinear optical process and is responsible for spectral expansion of the pump pulse. However in most cases, spectral broadening of input radiation provided by the pulsed pump radiation source is driven by soliton dynamics which require a pump pulse to propagate in a waveguide in the anomalous dispersion region (negative $\beta_2$). This is because, in the anomalous dispersion region, the effects of Kerr nonlinearity and dispersion act in opposition to each other. When the pulse parameters of a pump pulse, which is launched into a waveguide such as an optical fiber (e.g., HC-PCF) with anomalous chromatic dispersion, do not exactly match those of a soliton, the pump pulse will evolve into a soliton pulse with a certain soliton order and a dispersive wave. Further details of mechanisms for spectral broadening in soliton driven broadband radiation generation are provided in PCT Patent Application Publication No. WO 2022/122325, which is incorporated herein in its entirety by reference.

As an example, one particular method for generating broadband output radiation by an interaction between the input radiation and the non-linear medium is modulation instability. In a particular example, modulation instability of an ultrashort (e.g. ~100s of fs) infrared laser pulse (referred to as pump radiation) may be achieved by directing the laser pulse into a waveguide (e.g. a hollow core optical fiber), where the waveguide is filled with a non-linear medium, e.g. Kr gas at 25 bar of pressure. Such a waveguide features weakly anomalous (e.g. $\beta_2=-7$ $fs^2/cm$) group-velocity dispersion at the central wavelength of the pump laser, i.e. the situation in which shorter-wavelength components of the pulse travel faster than longer-wavelength components, which is exploited to access the soliton regime. As an example, pump radiation entering the waveguide may typically have a pulse duration of around 300 fs. At this point, the bandwidth of the radiation is relatively small (around a few nm), and the peak intensity (e.g. around 10 $TW/cm^2$) is insufficient to ionize the gas. In the course of broadband radiation generation by modulation instability as the pulse travels along the waveguide, the temporal structure of the pulse develops very sharp peaks which can have a duration of only a few fs or even a few hundred attoseconds, and yield a broad optical spectrum (tens to hundreds of nm) and high peak intensities, which can ionize the gas and lead to damage to the waveguide (such as glass deposition at the output of a fiber) as described above.

Figure 4A:
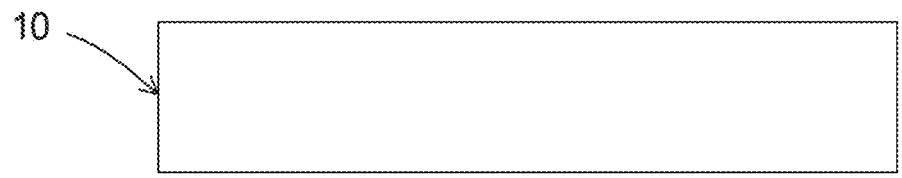
FIG. 4A depicts a schematic representation of a waveguide according to an embodiment in a transverse plane (i.e. perpendicular to an axis of the optical fiber)

Embodiments of the present disclosure relate to an improved waveguide for confining input radiation for use in a broadband radiation source. An example of a waveguide 10 is illustrated in FIG. 4A. In general, a waveguide 10 according to the present disclosure comprises an elongate body, which is longer in one dimension compared to the other two dimensions of the waveguide 10. In use, the waveguide 10 may contain a non-linear optical medium (such as a gas) that is pumped by the input radiation to create broadband output radiation.

The received input radiation may be electromagnetic radiation. The input radiation may be received as pulsed radiation. For example, the input radiation may comprise ultrafast pulses. The mechanism for the spectral broadening as the radiation interacts with the non-linear medium may be, for example, one or more selected from: four-wave mixing, modulation instability, ionization of the working gas, Raman effects, Kerr nonlinearity, soliton formation, and/or soliton fission. In particular, the spectral broadening may be achieved through soliton formation and/or soliton fission. In some examples, generating the broadband output radiation may comprise soliton self-compression.

The input radiation may be coherent radiation. The input radiation may be collimated radiation, an advantage of which may be to facilitate and improve the efficiency of coupling the input radiation into the waveguide 10. The input radiation may comprise a single frequency, or a narrow range of frequencies. The input radiation may be generated by a laser. Similarly, the output radiation may be collimated and/or may be coherent.

The broadband range of the output radiation may be a continuous range, comprising a continuous range of radiation frequencies. The output radiation may comprise supercontinuum radiation. Continuous radiation may be beneficial for use in a number of applications, for example in metrology applications. For example, the continuous range of frequencies may be used to interrogate a large number of properties. The continuous range of frequencies may for example be used to determine and/or eliminate a frequency dependency of a measured property. The supercontinuum output radiation may comprise, for example electromagnetic radiation over a wavelength range of 100 nm-4000 nm. The broadband output radiation frequency range may be for example 400 nm-900 nm, 500 nm-900 nm, or 200 nm-2000 nm. The supercontinuum output radiation may comprise white light.

Figure 4B:
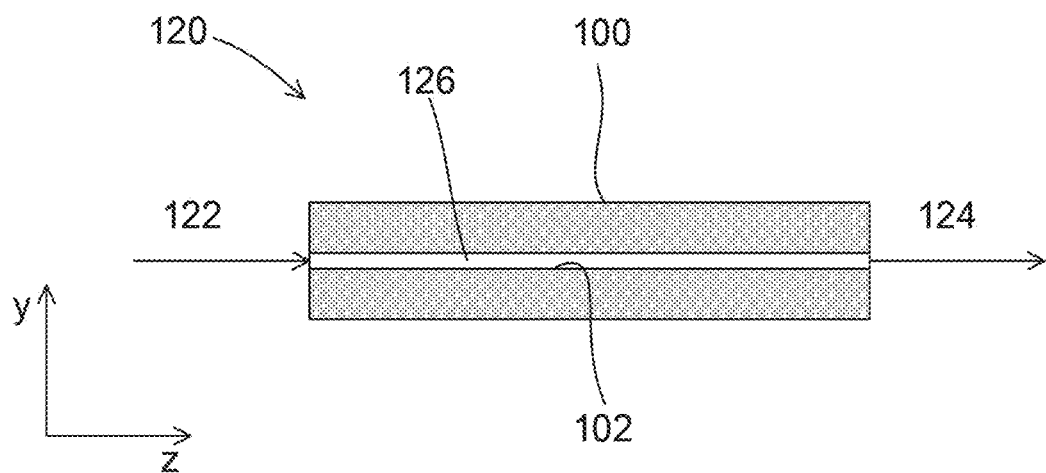
FIG. 4B is a schematic cross sectional view of an optical fiber according to an embodiment in a plane containing the axis of the optical fiber.

In some examples, as illustrated in FIG. 4B, the waveguide may be an optical fiber 100 forming part of an apparatus 120 for receiving input radiation 122 (i.e. pump radiation) and broadening a frequency range of the input radiation 122 so as to provide broadband output radiation 124.

In the example illustrated in FIG. 4B, the waveguide is a hollow core optical fiber 100, specifically a hollow core photonic crystal fiber (HC-PCF), comprising a hollow core 102 for guiding radiation propagating through the optical fiber 100. It will be appreciated that the fiber illustrated in FIG. 4B is shown in cross-section.

In use, a non-linear optical medium in the form of a gas 126 is disposed within the hollow core 102, wherein the gas 126 comprises a working component which enables the broadening of the frequency range of the received input radiation 122 so as to provide broadband output radiation 124. The working component of the gas 126 may be a noble gas. The working component may comprise one or more selected from: argon, krypton, neon, helium and/or xenon. Alternatively or additionally to the noble gas, the working component may comprise a molecular gas (e.g. $N_2$, $O_2$, $CH_4$, $SF_6$). In some examples, the apparatus 120 may further comprise a reservoir containing the gas 126, and the optical fiber 100 may be disposed within the reservoir, wherein the reservoir may be configured to control, regulate, and/or monitor the composition of the gas 126 inside the reservoir.

The optical fiber 100 may have any length and it will be appreciated that the length of the optical fiber 100 may be dependent on the application (for example the amount of spectral broadening that is desired in applications within a supercontinuum radiation source). The optical fiber 100 may have a length between 1 cm and 10 m, for example, the optical fiber 100 may have a length between 10 cm and 100 cm.

Figure 5A:
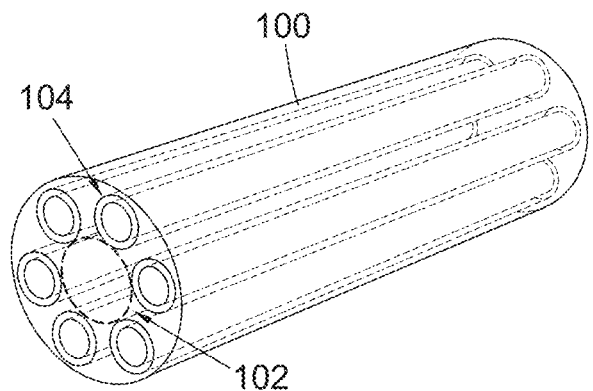
FIG. 5A illustrates an optical fiber comprising a plurality of anti-resonant elements according to an embodiment.

A further example of a HC-PCF (fiber) 100 is illustrated in FIG. 5A. The fiber 100 illustrated in FIG. 5A comprises a plurality of anti-resonant elements 104 surrounding a hollow core 102. The anti-resonance elements 104 are arranged to confine radiation that propagates through the optical fiber 100 predominantly inside the hollow core 102 and to guide the radiation along the optical fiber 100. The hollow core 102 of the optical fiber 100 may be disposed substantially in a central region of the optical fiber 100, so that the axis of the optical fiber 100 may also define an axis of the hollow core 102 of the optical fiber 100. Further details of the function of the anti-resonant elements 104 are provided in European Patent Application Publication No. EP3136143A1 and PCT Patent Application Publication No. WO2018127266A1 (which are both incorporated herein in their entireties by reference). In the examples illustrated in the present disclosure, the anti-resonant elements 104 are in the form of capillaries (for example, tubular capillaries) surrounding the hollow core 102. Therefore, in the present disclosure, the terms "anti-resonant element" and "capillary" are used interchangeably. The anti-resonant elements 104 may also be referred to as tubes.

Figure 5B:
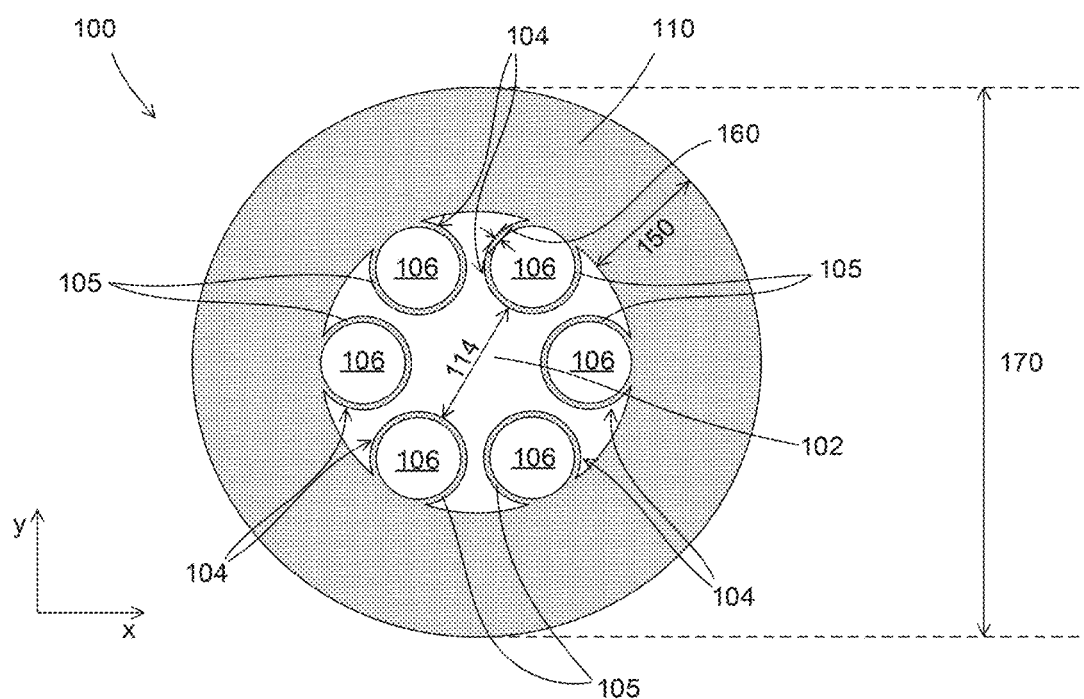
FIG. 5B is a schematic cross sectional view of an optical fiber comprising a plurality of anti-resonant elements according to an embodiment in a transverse plane (i.e. perpendicular to an axis of the optical fiber)

FIG. 5B illustrates a cross-section of the optical fiber 100 illustrated in FIG. 5A. It will be appreciated that the cross-section illustrated in FIG. 5B is in the transverse plane (i.e. perpendicular to the axis of the optical fiber), which is labelled as the x-y plane, while the cross-section illustrated in FIG. 4B is in the z-y plane. It will be further appreciated that the optical fiber 100 has some degree of flexibility and therefore the direction of the axis of the optical fiber 100 will not, in general, be uniform along the length of the optical fiber 100. Terms such as the axis, the transverse cross-section and the like will therefore be understood to mean the local axis, the local transverse cross-section and so on. Furthermore, where components are described as being cylindrical or tubular these terms will be understood to encompass such shapes that may have been distorted as the optical fiber 100 is flexed.

As illustrated in FIG. 5B, a hollow core optical fiber 100 may comprise: a hollow core 102; an inner cladding region surrounding the hollow core 102; and a jacket region 110 surrounding and supporting the inner cladding region.

The inner cladding region may comprise a plurality of capillaries 104, for example tubular capillaries, surrounding the hollow core 102. Each of the capillaries 104 acts as an anti-resonance element for guiding radiation propagating through the optical fiber 100. In particular, in the example illustrated in FIGS. 5A and 5B, the inner cladding region comprises a single ring of six tubular capillaries 104.

The capillaries 104 are generally configured to suppress higher order modes in the fiber 100, preventing coupling of the (desired) fundamental optical mode to higher order modes, which reduces losses in the fiber 100.

The capillaries 104 may be circular in cross section, or may have another shape. Each capillary 104 may comprise a generally cylindrical wall portion 105 that at least partially defines the hollow core 102 of the optical fiber 100 and separates the hollow core 102 from a cavity 106. It will be appreciated that the wall portion 105 may act as an anti-reflecting Fabry-Perot resonator for radiation that propagates through the hollow core 102 (and which may be incident on the wall portion 105 at a grazing incidence angle). A thickness 160 of the wall portion 105 may be suitable so as to ensure that reflection back into the hollow core 102 is generally enhanced whereas transmission into the cavity 106 is generally suppressed. In some embodiments, the capillary wall portion 105 may have a thickness 160 smaller than 400 nm, smaller than 300 nm, or smaller than 150 nm.

It will be appreciated that, as used herein, the term inner cladding region is intended to mean a region of the optical fiber 100 for guiding radiation propagating through the optical fiber 100 (i.e. the capillaries 104 which confine the radiation within the hollow core 102). The radiation may be confined in the form of transverse modes, propagating along the fiber axis.

The jacket region 110 may be generally tubular and may support the capillaries 104 of the inner cladding region. The capillaries 104 may be distributed evenly around an inner surface of the jacket region 110. The capillaries 104 may be described as surrounding the hollow core 102 in a symmetrical arrangement. In embodiments comprising six capillaries 104, the capillaries 104 may be described as being disposed in a generally hexagonal formation.

The capillaries 104 may be arranged so that each capillary is not in contact with any of the other capillaries 104. Each of the capillaries 104 may be in contact with the jacket region 110 and spaced apart from adjacent capillaries 104 in a ring structure. Such an arrangement may be beneficial since it may increase a transmission bandwidth of the optical fiber 100 (relative, for example, to an arrangement wherein the capillaries are in contact with each other). Alternatively, in some embodiments, each of the capillaries 104 may be in contact adjacent capillaries 104 in the ring structure.

The capillaries 104 of the inner cladding region may be disposed in a ring structure around the hollow core 102. An inner surface of the ring structure of capillaries 104 at least partially defines the hollow core 102 of the optical fiber 100. In some embodiments, a diameter of the hollow core 102 (which, in embodiments comprising capillaries 104, may be defined as the smallest dimension between opposed capillaries, indicated by arrow 114) may be between 5 μm and 100 μm. In some embodiments, the diameter 114 of the hollow core 102 may be between 5 μm and 50 μm. In some embodiments, the diameter 114 of the hollow core 102 may be between 30 μm and 40 μm. The diameter 114 of the hollow core 102 may affect the mode field parameter, impact loss, dispersion, modal plurality, and non-linearity properties of the hollow core optical fiber 100.

In the embodiment illustrated in FIGS. 5A and 5B, the inner cladding region comprises a single ring arrangement of capillaries 104 (which act as anti-resonance elements). Therefore, a line in any radial direction from a center of the hollow core 102 to an exterior of the optical fiber 100 passes through no more than one capillary 104.

It will be appreciated that other embodiments may be provided with different arrangements of anti-resonance elements. These may include arrangements having multiple rings of anti-resonance elements and arrangements having nested anti-resonance elements. Furthermore, although the embodiment shown in FIGS. 5A and 5B comprises a ring of capillaries 104 with wall portions 105, in other embodiments, one or more rings comprising any number of anti-resonance elements (for example 4, 5, 6, 7, 8, 9, 10, 11 or 12 capillaries) may be provided in the inner cladding region.

In the embodiment illustrated in FIGS. 5A and 5B, the inner cladding region comprises a circular cross-section. However, it will be appreciated that other embodiments may be provided with inner cladding regions having cross-sections of shapes other than circular. For example, in an embodiment, the inner cladding region may have a hexagonal cross-section. A hexagonal cross-section may advantageously facilitate easier placement of the capillaries 104 in a symmetrical arrangement. For example, capillaries 104 may be each placed at a vertex of the hexagonal cross-section, providing an arrangement of capillaries 104 having hexagonal symmetry.

The ability of the optical fiber 100 to achieve effective guiding and confinement of radiation in the fiber 100 may be largely governed by the internal dimensions of the fiber 100. That is, the hollow core diameter 114, the arrangement of the capillaries 104, the thickness 160 of the capillary wall portions 105, and/or the shape and dimensions of the anti-resonance cavities 106. It will be understood that these parameters are therefore generally constrained within a certain range of acceptable values, outside of which a HC-PCF will not function correctly. Examples of possible such constraints on these parameters are described in European Patent Application Publication No. EP3136143.

The jacket region 110 may be formed from a material that comprises glass. That is, the material may comprise an amorphous (i.e. non-crystalline) material that exhibits a glass transition when heated to a transition temperature. For example, the material may comprise a silica glass. For example, parts of the optical fiber 100 (for example the capillaries 104 and the jacket region 110) may comprise any of the following: high purity silica ($SiO_2$) (for example the F300 material as marketed by Heraeus Holding GmbH of Germany); soft glasses such as for example lead-silicate glass (for example the $SF_6$ glass marketed by Schott AG of Germany); or other specialty glasses such as chalcogenide glass or heavy metal fluoride glasses (also referred to as ZBLAN glasses). Advantageously, glass materials do not outgas. Detailed examples of methods of manufacturing HC-PCFs are known in the art, for example as described in European Patent Application Publication No. EP3136143.

As discussed above, in the case of an optical fiber, damage (such as deposition of glass particles) can occur where the output radiation 124 (see FIG. 4B) exits the waveguide (e.g. the optical fiber). Such damage may be confined to the exit at least partly due to the high concentration of edges and protrusions, partly caused by structural defects at the end of the waveguide. This problem may therefore be partly solved by smoothing the end of the waveguide.

Figure 6:
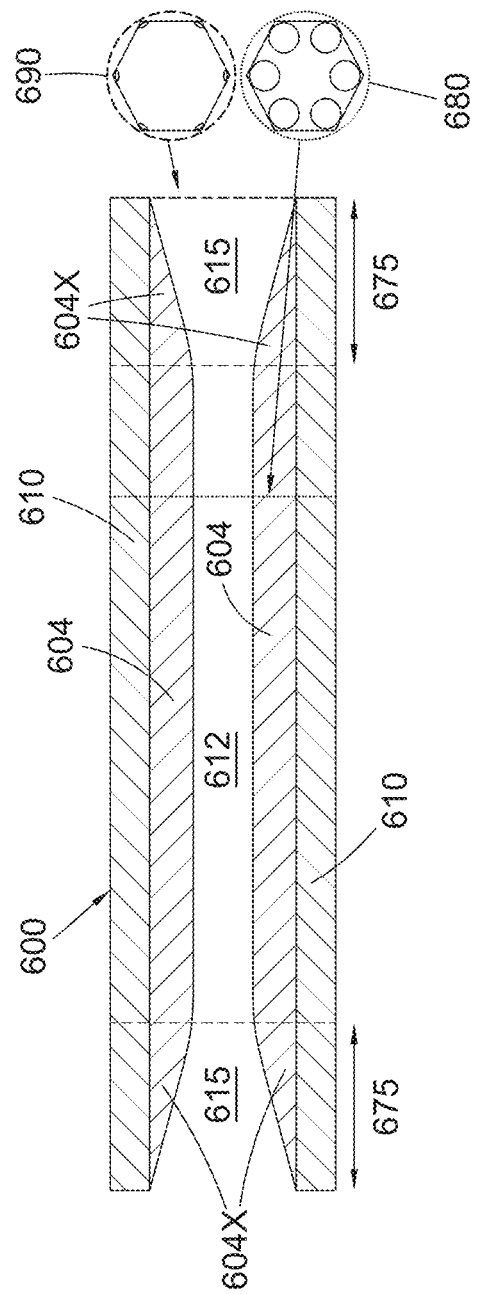
FIG. 6 is a schematic cross sectional view of a prior art optical fiber comprising collapsed anti-resonant elements over a length of ~100s of μm.

FIG. 6 illustrates an example of an optical fiber 600 adapted to address the problem of damage caused by deposition of glass particles. It will be appreciated that the optical fiber 600 may be mostly the same as the optical fiber 100 illustrated in FIGS. 5A and 5B: in a first, main, section 612, the optical fiber 600 illustrated in FIG. 6 comprises a plurality of anti-resonant elements 604 distributed around an inner surface of a jacket region 610 and surrounding a core, such that the core diameter is defined by the inner surfaces of the anti-resonant elements 604, as shown in the first inset 680 in cross-section at the point indicated by the arrow. (The inner cladding region of the optical fiber 600 of FIG. 6 has a hexagonal cross-section, but it will be appreciated in light of the description above that the optical fiber 600 could equally have a circular cross section, similarly to the optical fiber illustrated in FIGS. 5A and 5B, or any other suitable cross section.) However, the optical fiber 600 further comprises, at one or both ends (i.e., referring also to FIG. 4B, the end at which output radiation 124 would exit the fiber 600 and/or the end at which input radiation 122 would enter the fiber 600), a section 615 in which the anti-resonant elements 604 have been collapsed 604X. As shown in the second inset 690 in cross section at the end of the fiber 600, the total surface area of the end of the fiber is reduced compared to a fiber having as its end cross section that shown in the first inset 680. The reduced surface area results in less deposition of etched glass following the ionization process discussed above since the surface on which the glass can be deposited is reduced. Importantly, the length(s) 675 of the section(s) 615 comprising the collapsed anti-resonant elements 604X are very short (typically ~100s of µm).

While optical fibers 600 of the type illustrated in FIG. 6 have been found to exhibit improved lifetimes under certain conditions, the lifetimes of such fibers may be limited to ~100 days under many practical operating conditions, and damage at the output due to ionization of the gas is still dominant. Further improvements to the lifetime by reducing damage at the output of the fiber are therefore desired.

It is therefore proposed, according to the present disclosure, to provide a waveguide for use in the generation of broadband radiation that achieves a reduction in the intensities of the peaks of the generated broadband radiation (supercontinuum) pulse before the broadband radiation pulse exits the waveguide. While the examples described herein primarily relate to hollow core optical fibers (in particular, HC-PCFs filled with gas as the non-linear medium to achieve spectral broadening), it will be appreciated that the principles described herein may equally be applied to any type of waveguide suitable for use in broadening a wavelength spectrum of pulsed radiation applied to an input end of the waveguide. For example, the waveguide could be a solid core optical fiber.

In brief, the present disclosure aims to reduce the intensity of the generated broadband radiation quickly by stretching the spectral peaks in time, achieved by including a section of the waveguide that exhibits normal dispersive properties before the exit of the waveguide. This results in lower peak intensities and, as the density of generated free electrons depends nonlinearly on peak intensity, to strongly reduced ionization.

A Gaussian shape is often used to approximate "real" pulses, the peak intensity of a Gaussian pulse undergoing group-velocity dispersion can be written as $$I(z) = I(z=0)\left[1 + (4\ln(2))^2 \frac{z^2 \beta_2^2}{\tau_{FWHM}^4}\right]^{-0.5}, \quad \text{Equation (1)}$$

where z is the position along a dispersive waveguide section (in meters), $\beta_2$ is the group velocity dispersion at the central pump wavelength (in s²/m) and TFWHM is the full-width half-maximum duration of the Gaussian pulse. The value of $\beta_2$ depends on the waveguide parameters (in the case of a hollow core fiber of the type illustrated in FIGS. 5A and 5B, the waveguide parameters include the core diameter and capillary-wall thickness) and the parameters of the optical medium (in the case of a gas: species, pressure, temperature). $\beta_2$ can be calculated numerically.

FIGS. 7A-7E illustrate various examples of waveguides 700 comprising a first section 712 and a second section 716A-E. The first section 712 is configured to broaden an input radiation pulse by a non-linear process, such as any of the processes discussed above. For example, the waveguide 700 may be filled with a non-linear optical medium such as a gas. In the examples illustrated in FIGS. 7A-7E, the first section 712 has a particular inner diameter (e.g. core diameter) defined by a distance between opposite inner surfaces of the waveguide 700. The inner diameter and other properties of the first section 712 are configured such that input radiation pulses arriving in the first section are broadened by a non-linear process. For example, the waveguide 700 may be a hollow core optical fiber comprising a jacket region 710, and a plurality of anti-resonant elements 704 distributed around an inner surface of the jacket region 710 and surrounding the core, similarly to the example illustrated in FIGS. 5A and 5B. However, it will be understood that the waveguide 700 may be any type of waveguide (e.g. a solid core optical fiber) in which the first section 712 is configured to broaden a wavelength spectrum of pulsed radiation provided to an input end of the waveguide 700. While, in the examples illustrated in FIGS. 7A-7E, the illustrated portions of the first section 712 are shown having a constant inner (core) diameter, it will be appreciated that the first section 712 may in some cases comprise one or more tapered or waist sections having smaller inner diameters as described in PCT Patent Application Publication No. WO 2022122325. In contrast to the first section 712, the second section 716A-E is configured to exhibit normal dispersion at the central wavelength of the input radiation, which results in temporal stretching of the radiation pulses.

Figure 7A:
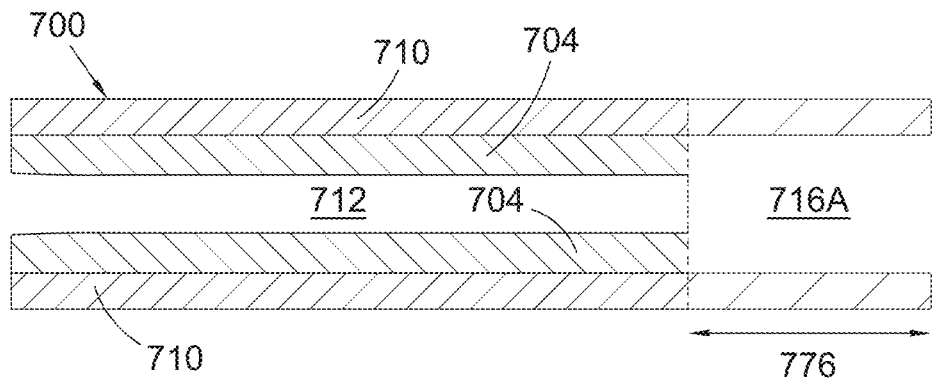
FIG. 7A is a schematic cross sectional view of an optical fiber comprising a straight second section according to an embodiment in a plane containing the axis of the optical fiber.

As a first example, illustrated in FIG. 7A, the second section 716A of the waveguide 700 may comprise a straight section having a larger inner (core) diameter than the first section 712. That is, the diameter of the core in the second section 716A is constant over the length of the second section 716A. For example, where the waveguide 700 is a hollow core fiber comprising anti-resonant elements 704 in the first section 712, the second section 716A may comprise a portion of hollow core fiber without any anti-resonant elements. The second section 716A could be spliced or butt-coupled to the output end of an existing fiber to form the waveguide 700 illustrated in FIG. 7A. As an example, following Equation (1) (above), the intensity of a ~4 fs long peak in the broadened spectrum having a peak intensity of ~40 TW/cm$^2$ at z=0 (where it will be understood that z=0 may correspond to the dashed line in FIG. 7A-E) would be reduced by a factor of 4 following propagation through a second section 716A of fiber having a core diameter of 60 µm and filled with 30 bar of Kr gas, corresponding to $\beta_2$=5.5 fs$^2$/cm, and a length 776 of ~4 cm.

There also may exist a maximum length 776 of the second section 716A-E of the waveguide 700, beyond which the power of the radiation pulses propagating through the waveguide 700 falls below a usable level. In the case of a hollow core optical fiber second section 716A without any anti-resonant elements, losses are caused by radiation leaking through the wall surrounding the core and/or coupling to higher order optical modes, which are otherwise suppressed by the anti-resonant elements 704 in the first section 712. The example described above of a second section 716A of fiber having a core diameter of 60 µm and filled with 30 bar of Kr gas exhibits a power loss of 73 dB/m, so half of the power of the broadened radiation would be lost over the ~4 cm length.

Figure 7B:
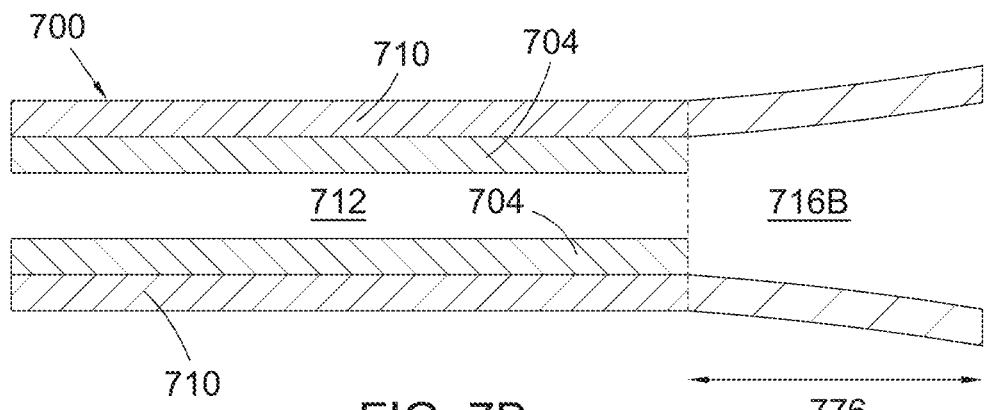
FIG. 7B is a schematic cross sectional view of an optical fiber comprising an upwardly-tapered second section according to an embodiment in a plane containing the axis of the optical fiber.

In a second example of the waveguide 700, illustrated in FIG. 7B, the second section 716B may comprise an upwardly tapered section. That is, the diameter of the core in the second section 716B increases with increasing distance from the first section over at least a portion of the second section 716B. The peak intensity of the peaks in the broadened spectrum scale with the inverse square of the inner (core) diameter of the waveguide 700. Therefore, even a weakly upwardly-tapered second section 716B would lead to strongly reduced ionization of the optical medium (gas), resulting in further improvements in the lifetime of the waveguide.

Figure 7C:
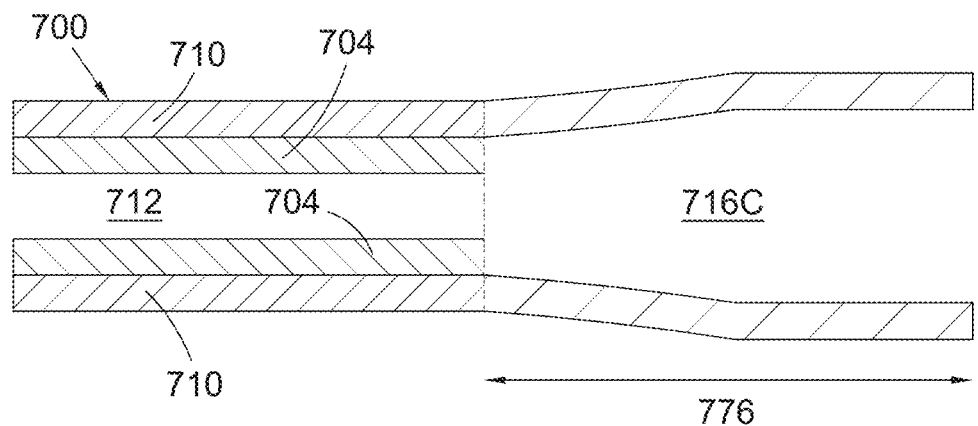
FIG. 7C is a schematic cross sectional view of an optical fiber comprising a second section having a straight portion and an upwardly-tapered portion according to an embodiment in a plane containing the axis of the optical fiber.

It will be appreciated that straight and tapered sections could be combined to form the second section 716C, as illustrated in the example of FIG. 7C. The diameters, lengths, and tapering of different sections that make up the second section 716C may be selected according to the required temporal stretching and reduction in peak intensity of the peaks of the broadened radiation. It will be appreciated that the total length 776 of the second section 716A-E should be considered to balance the need to maximize the reduction in the peak intensity while also minimizing power losses.

Although not shown, it will be appreciated that the examples illustrated in FIGS. 7A-7C may comprise collapsed (over a few 100s of µm) anti-resonant elements 604X of the type illustrated in FIG. 6.

Figure 7D:
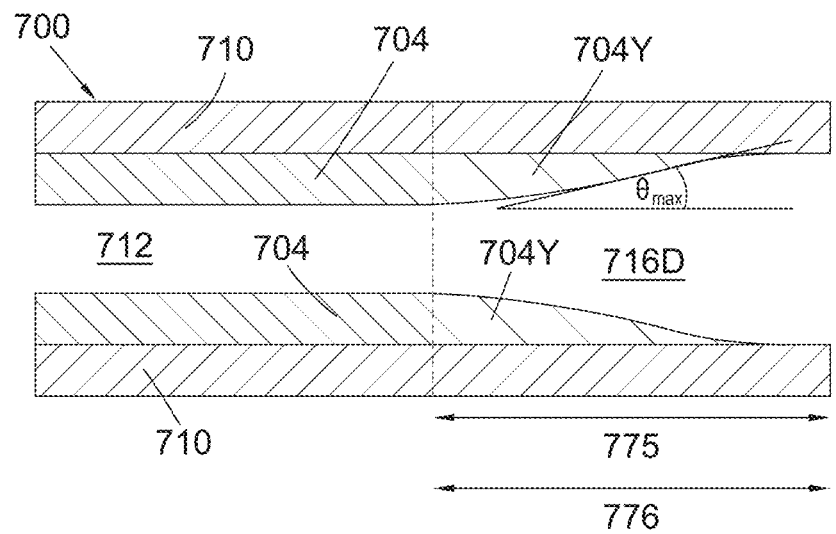
FIG. 7D is a schematic cross sectional view of an optical fiber comprising a second section having collapsed anti-resonant elements according to an embodiment in a plane containing the axis of the optical fiber.

In a further example, illustrated in FIG. 7D, where the waveguide 700 comprises anti-resonant elements 704, an upwardly-tapered second section 716D may be formed by collapsing the anti-resonant elements 704Y over a length 775 of the waveguide 700. That is, a cross-sectional area of each of the anti-resonant elements 704Y in the second section 716D decreases with increasing distance from the first section 712. It will be appreciated that the second section 716D, comprising collapsed anti-resonant elements 704Y, may be considered as an alternative form of an upwardly-tapered section such as the second section 716B illustrated in FIG. 7B. As discussed above, the anti-resonant elements 704 serve to prevent unwanted coupling of the fundamental optical mode to higher order modes. By ensuring the fiber region over which the capillaries gradually collapse to meet the adiabaticity criterion, unwanted coupling of the (desired) fundamental optical mode to higher-order modes can be suppressed. For an up-tapered core (i.e., gradually collapsed "single-ring" photonic structure), the adiabaticity criterion expresses the maximum angle $\theta_{max}$ at which the core diameter of the fiber is allowed to increase:

$$\theta_{max} = \frac{r}{2\pi}(n_{fund} - n_{HOM}), \quad \text{Equation (2)}$$

where r is the core radius of the first waveguide section 712, $\Delta$ is the wavelength of the radiation, $n_{fund}$ and $n_{HOM}$ are the effective refractive indices of the fundamental and closest higher order optical mode at wavelength A, respectively. Further discussion of the adiabaticity criterion is provided in R. Pennetta, et al., APL Photonics 4, 056105 (2019), which is incorporated herein in its entirety by reference. For the example of a gas-filled fiber, $n_{fund}$ and $n_{HOM}$ can be approximated as:

$$n_{fund} = \sqrt{n_{gas}^2 - \left(\frac{u_{01}\lambda}{2\pi r}\right)^2}, \quad n_{HOM} = \sqrt{n_{gas}^2 - \left(\frac{u_{11}\lambda}{2\pi r}\right)^2}, \quad \text{Equation (3)}$$

(see: E. A. J. Marcatili and R. A. Schmeltzer, *Bell Syst. Tech. J.* 43, 1783 (1964), incorporated herein in its entirety by reference) where $n_{gas}$ is the refractive index of the gas filling the fiber, and $u_{01} \approx 2.40$ and $u_{11} \approx 3.83$ are the first zeros of the Bessel function of the kind 0 and 1, respectively. Calculations using Equation (2) show that the taper angle $\theta_{max}$ is mostly restricted by the short-wavelength behavior: at a wavelength of 400 nm, a typical value of $\theta_{max}$ is ~0.1°, which translates to a maximum increase in core diameter of roughly 1 µm per mm of length of the waveguide 700. It will therefore be appreciated that a minimum length 775 of the second section 716D over which the anti-resonant elements 704Y can be collapsed exists, where the minimum length 775 is of the order of several mm and is therefore significantly longer than the lengths over which the anti-resonant elements 604X are collapsed in fibers 600 of the type illustrated in FIG. 6. Where the waveguide 700 is an optical fiber of the type described herein and illustrated in FIGS. 5A and 5B, the length 775 over which the anti-resonant elements 704Y can be collapsed to meet the adiabaticity criterion may be approximately 7 mm. Therefore, for waveguides 700 comprising a second section 716D of the type illustrated in FIG. 7D, the length 776 of the second section 716D should be at least the length 775 over which the anti-resonant elements 704Y can be collapsed to meet the adiabaticity criterion.

Figure 7E:
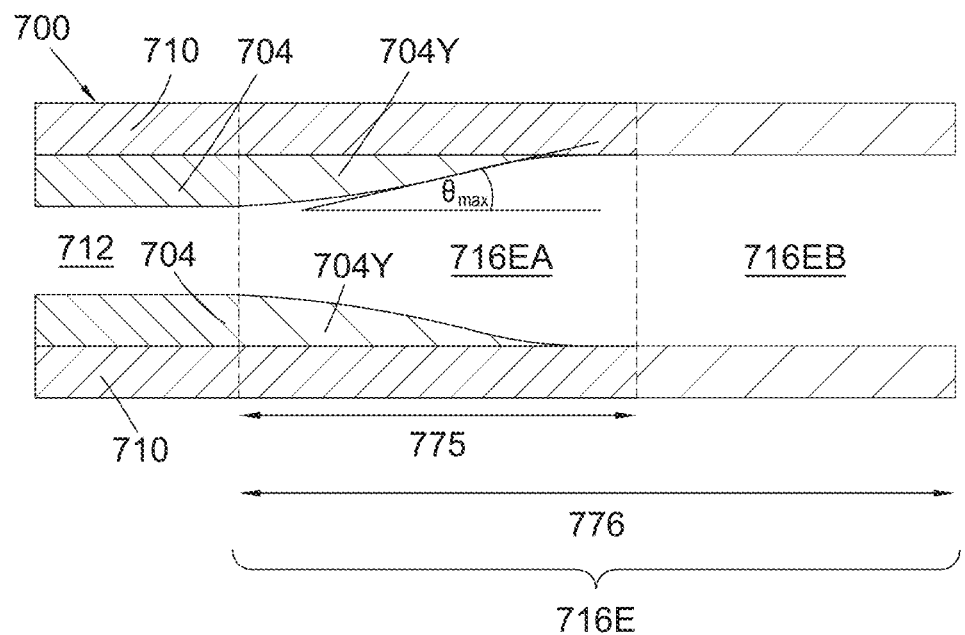
FIG. 7E is a schematic cross sectional view of an optical fiber comprising a second section comprising a portion having collapsed anti-resonant elements and straight portion with no anti-resonant elements according to an embodiment in a plane containing the axis of the optical fiber.

FIG. 7E illustrates an example of a waveguide 700, such as an optical fiber comprising anti-resonant elements 704, in which the second section 716E comprises both collapsed anti-resonant elements 704Y of the kind illustrated in FIG. 7D in a first part 716EA of the second section 716E, and a straight section of fiber without any anti-resonant elements in a second part 716EB of the second section 716E. It will be appreciated that the second section 716E could equally be formed from a combination of sections comprising collapsed anti-resonant elements of the type illustrated in FIG. 7D, straight sections of the type illustrated in FIG. 7A, and/or tapered sections of the type illustrated in FIG. 7B. The diameters, lengths, and/or tapering of different sections that make up the second section 716C may be selected according to the required temporal stretching and reduction in peak intensity of the peaks of the broadened radiation. It will be appreciated that the total length 776 of the second section 716A-E should be considered to balance the need to maximize the reduction in the peak intensity while also minimizing power losses.

FIG. 8 illustrates, as a numerically simulated example, the evolution of (a) full-width half-maximum pulse duration and (b) peak intensity of a 2.5 fs long peak of energy ~50 nJ, propagating along a 5 cm long section of a hollow core optical fiber with no anti-resonant elements. In more detail, a single (Fourier-transform-limited) modulation instability peak with a duration of 2.5 fs (approximated as a Gaussian pulse) would produce a ~510 nm bandwidth (full-width half-maximum) at 1030 nm central wavelength. Assuming this spike to contain 1% of the original pulse energy of 5 µJ, its peak power is 19 MW. If that spike propagates in a hollow fiber with inner diameter of 62 µm (normal group-velocity dispersion, $\beta_2 = 1$ fs$^2$/cm), the peak intensity is ~2.2 TW/cm$^2$. After propagation over a length of only 5 cm (in the absence of nonlinear effects), the pulse will be stretched to ~6 fs, yielding a peak intensity of ~0.5 TW/cm$^2$. As can be clearly seen, the pulse duration more than doubles and the peak intensity is reduced by approximately a factor of 4 over the 5 cm length. Based on this modelling, it is estimated that the reduction in peak intensity at the output of the fiber may increase the fiber lifetime from ~100 days to ~1000 days due to the reduced ionization-induced damage.

The simulated example of FIG. 8 exhibits a power loss (caused by coupling of the fundamental mode to higher order modes, described above) of ~40 dB/m, leading to a power loss of ~2 dB over the simulated 5 cm length.

In order to reduce or prevent damage to the waveguide when radiation exits the waveguide, as described above, it is desired to reduce the intensity of peaks in the broadened spectrum by an amount corresponding to a reduction in damage suitable to extend the lifetime of the waveguide by a desired amount. As described above and in relation to Equation (1), the reduction in intensity of the peaks in the broadened spectrum at the output end of the waveguide is determined, for a second section of the waveguide having particular properties (i.e. a particular $\beta_2$), by the length of the second section of the waveguide. For example, the length of second section may be configured to reduce a peak intensity of one or more peaks in the broadened wavelength spectrum by at least 20%. In some examples, the length of the second section may be configured to reduce a peak intensity of one or more peaks in the broadened spectrum by at least 25%, desirably by at least 50%, or more desirably by at least 75%. A decrease in peak intensity is beneficial, as ionization scales highly nonlinearly with intensity.

In order to help ensure that the power of the broadened radiation is maintained at a useable level when exiting the waveguide, a maximum length of the second section of the waveguide may be defined as a length corresponding to a power reduction of the broadened radiation spectrum by less than 6 dB. Depending on the particular properties of the waveguide, a maximum length of the second section may therefore be defined as around 20 cm, desirably around 15 cm, or more desirably around 10 cm.

Figures 10A, 10B, 10C:
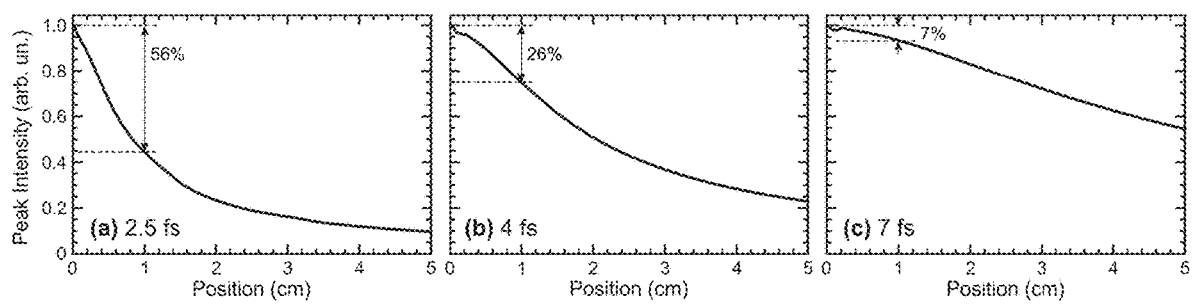
FIGS. 10a, 10b and 10c illustrate reduction in peak intensity of a spectrally broadened radiation pulse at 1030 nm central wavelength as a function of the length of the section of a hollow core optical fiber with no anti-resonant elements, and for three different pulse lengths (2.5, 4 and 7 fs).

FIGS. 10a, b and c illustrate simulated reductions in peak intensity of radiation pulses with a broadened spectrum around a central wavelength of 1030 nm after exiting a non-linear hollow core fiber based waveguide that is filled with krypton as a non-linear medium. In this example the fiber is provided with anti-resonant radiation-confining elements in a first section followed by a second section filled with the same gas at the same pressure, but not being provided with anti-resonant elements (as sketched in FIG. 7A). For clarity, in the simulations of FIGS. 10a, b and c the total dispersion in the second section of the hollow-core fiber was approximated by pure (second-order) group-velocity dispersion. The second section had a diameter which was approximately twice the core diameter of the first section of the hollow core fiber. The length of the second section was varied between 0 and 5 cm, at three different pulse durations of the input (pump) radiation: FIG. 10a corresponds to a pulse duration of 2.5 fs, FIG. 10b to a pulse duration of 4 fs and FIG. 10c to a pulse duration on 7 fs. FIG. 10a demonstrates that for a length of the second section of 1 cm the peak intensity will be reduced by 56% compared to a configuration in which no second section is present. For longer durations of the pump pulse the peak intensity reductions becomes less, becoming as little as 7% for a 1 cm length second section in case the pump pulses have a duration of 7 fs. For practical cases the pump pulses typically have a duration of 1-10 fs and a minimum length of the second section of 0.5 cm will typically be sufficient to significantly reduce the peak intensity, by 20-30% for example in case the pulse duration is (close to) 2.5 fs.

Methods of manufacturing a waveguide 700 according to the present disclosure will now be described.

Manufacturing a waveguide 700 according to the present disclosure comprises forming the first section of the waveguide and forming the second section of the waveguide. An example of a method 900 of manufacturing a waveguide according to the present disclosure is illustrated in FIG. 9. In a first step S901, the method 900 comprises forming a first section of the waveguide, the first section being configured to broaden, by a non-linear optical process, a wavelength spectrum of pulsed radiation provided to an input end of the waveguide. In a second step S902, the method 900 further comprises forming a second section of the waveguide, the second section comprising an output end of the waveguide, the second section being configured to exhibit a larger absolute value of group velocity dispersion than the first section, wherein a length of the second section is configured to reduce a peak intensity of one or more peaks in the broadened wavelength spectrum by at least 20%.

In some examples, forming the second section of the waveguide may comprise receiving a waveguide, and modifying a section of the waveguide that comprises the output end of the waveguide. It will be understood that modifying the section of the waveguide that comprises the output end of the waveguide may comprise attaching a further section of waveguide to the output end of the waveguide, and/or making adjustments directly to the output end of the received waveguide.

In some examples, the first and second sections of the waveguide 700 may be formed by attaching two sections of the waveguide together.

In some examples, attaching the second section to the first section may comprise splicing the second section to the first section. For example, splicing the second section to the first section may comprise splicing together two ends of waveguide sections having the same external diameter. In some examples, splicing the first and second sections together may result in a continuous join between the first and second sections.

In some examples, attaching the second section to the first section may comprise coupling the second section to the first section. For example, butt-coupling the second section to the first section. In some examples, coupling the second section to the first section may result in a very small gap (e.g. smaller than 300 µm, smaller than 200 µm or smaller than 100 µm) between the first and second sections.

In some examples, the first and second sections may comprise a plurality of anti-resonant elements, e.g. of the type described above. Forming the second section, in particular a second section of the type illustrated in FIGS. 7D and 7E, may comprise heating the second section and elongating the second section by applying a pulling force. For example, in the case of an optical fiber, the second section may be formed by heating a fiber (e.g., scanning a heat source or oxy-butane flame along the length of a fiber) while gently applying a pulling force at both ends. Precise control of the extension of the heated area during the elongation process allows production of arbitrary profiles (e.g. tapering) and lengths of the collapsed portions of the anti-resonant elements.

While the examples described herein primarily relate to hollow core optical fibers (e.g. HC-PCFs), it will be appreciated that the examples and methods described in the present disclosure may generally be applied to other types of waveguide. In some examples, the examples and methods described herein may be applied to solid core optical fibers. As an example, a solid core fiber may comprise a flexible glass rod. It will be appreciated that a solid core optical fiber may comprise hollow structures arranged in a similar arrangement to the solid cylindrical wall portions 105 forming the capillaries 104 illustrated in FIG. 5B. The hollow channels provide a smaller "average" refractive index of the cladding compared to the (unstructured) core. As a result, such a structure still supports a form of "total internal reflection."

While embodiments have been described in terms of cylindrical waveguides, cores, etc., it will be appreciated that different shapes can be used. Accordingly, references to diameter herein should be understood as including the cross-sectional width of such other shapes.

Further embodiments are disclosed in the list of numbered clauses below:

1. A waveguide comprising:
    a first section, the first section being configured to generate, by a non-linear optical process, a broadened wavelength spectrum of pulsed radiation provided to an input end of the waveguide;
    a second section, the second section comprising an output end of the waveguide, the second section being configured to exhibit a larger absolute value of group velocity dispersion than the first section;
    wherein a length of the second section is between 0.5 cm and 20 cm and configured to reduce a peak intensity of one or more peaks in the broadened wavelength spectrum by at least 20%.
2. A waveguide according to clause 1, wherein the second section is configured to exhibit normal group velocity dispersion.
3. A waveguide according to clause 1 or clause 2, comprising a core extending axially along the first and second sections of the waveguide;
    wherein a diameter of the core in the second section is greater than a diameter of the core in the first section.
4. A waveguide according to clause 3, wherein the diameter of the core in the second section is constant over the length of the second section.
5. A waveguide according to clause 3, wherein the diameter of the core in the second section increases with increasing distance from the first section over at least a portion of the second section.
6. A waveguide according to any of clauses 3 to 5, further comprising a plurality of anti-resonant elements surrounding the core in the first section;
    wherein the plurality of anti-resonant elements surround the core in at least a portion of the second section, and further wherein a cross-sectional area of each of the anti-resonant elements decreases in the second section with increasing distance from the first section.
7. A waveguide according to any of clauses 3 to 5, further comprising a plurality of anti-resonant elements surrounding the core in the first section, and wherein the second section is provided without any anti-resonant elements.
8. A waveguide according to any of the preceding clauses, wherein the waveguide is a hollow-core photonic crystal fiber.
9. A waveguide according to any of clauses 1 to 7, wherein the waveguide is a solid-core optical fiber.
10. A waveguide according to any of the preceding clauses, wherein the length of the second section is configured to reduce a power of the broadened radiation spectrum by less than 6 dB.
11. A waveguide according to any of the preceding clauses, wherein the length of the second section is less than 10 cm.
12. A method of manufacturing a waveguide, the method comprising:
    forming a first section of the waveguide, the first section being configured to broaden, by a non-linear optical process, a wavelength spectrum of pulsed radiation provided to an input end of the waveguide; and
    forming a second section of the waveguide, the second section comprising an output end of the waveguide, the second section being configured to exhibit a larger absolute value of group velocity dispersion than the first section;
    wherein a length of the second section is between 0.5 cm and 20 cm and configured to reduce a peak intensity of one or more peaks in the broadened wavelength spectrum by at least 20%.
13. A method according to clause 12, wherein forming the first and second sections of the waveguide comprises:
    receiving a waveguide; and
    modifying a section of the waveguide comprising the output end of the waveguide.
14. A method according to clause 12 or clause 13, wherein forming the second section of the waveguide comprises attaching the second section to the first section.
15. A method according to clause 14, wherein attaching the second section to the first section comprises one or more selected from:
    splicing the second section to the first section; and/or
    coupling the second section to the first section.
16. A method according to any of clauses 12 to 15, wherein the first and second sections of the waveguide comprise a plurality of anti-resonant elements surrounding a core, and wherein forming the second section comprises collapsing the plurality of anti-resonant elements in the second section.
17. A method according to clause 16, wherein collapsing the plurality of anti-resonant elements in the second section comprises:
    heating the second section; and
    elongating the second section by applying a pulling force.
18. A method according to any of clauses 12 to 17, wherein the waveguide is a hollow-core photonic crystal fiber.
19. A method according to any of clauses 12 to 17, wherein the waveguide is a solid core optical fiber.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments in the context of a lithographic apparatus, embodiments may be used in other one or more apparatuses. Embodiments may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Although specific reference may have been made above to the use of embodiments in the context of optical lithography, it will be appreciated that the invention, where the context allows, is not limited to optical lithography and may be used in other applications, for example imprint lithography.

While specific embodiments of the invention have been described above, it will be appreciated that the invention may be practiced otherwise than as described. For example, the invention may take the form of a computer program containing one or more sequences of machine-readable instructions configured to implement a method (or one or more parts thereof) as disclosed above, or a data storage medium (e.g. semiconductor memory, magnetic or optical disk) having such a computer program stored therein.

While specific embodiments have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A waveguide comprising:
    a first section configured to generate, by a non-linear optical process, a broadened wavelength spectrum of pulsed radiation provided to an input end of the waveguide; and
    a second section comprising an output end of the waveguide, the second section configured to exhibit a larger absolute value of group velocity dispersion than the first section,
    wherein a length of the second section is between 0.5 cm and 20 cm and configured to reduce a peak intensity of one or more peaks in the broadened wavelength spectrum by at least 20%.

2. The waveguide according to claim 1, wherein the second section is configured to exhibit normal group velocity dispersion.

3. The waveguide according to claim 1, further comprising a core extending axially along the first and second sections of the waveguide, and wherein a diameter of the core in the second section is greater than a diameter of the core in the first section.

4. The waveguide according to claim 3, wherein the diameter of the core in the second section is essentially constant over the length of the second section.

5. The waveguide according to claim 3, wherein the diameter of the core in the second section increases with increasing distance from the first section over at least a portion of the second section.

6. The waveguide according to claim 3, further comprising a plurality of anti-resonant elements surrounding the core in the first section, wherein the plurality of anti-resonant elements surround the core in at least a portion of the second section, and wherein a cross-sectional area of each of the anti-resonant elements decreases in the second section with increasing distance from the first section.

7. The waveguide according to claim 3, further comprising a plurality of anti-resonant elements surrounding the core in the first section, and wherein the second section is provided without any anti-resonant elements.

8. The waveguide according to claim 1, wherein the waveguide is a hollow-core photonic crystal fiber.

9. The waveguide according to claim 1, wherein the waveguide is a solid-core optical fiber.

10. The waveguide according to claim 1, wherein the length of the second section is configured to reduce a power of the broadened radiation spectrum by less than 6 dB.

11. The waveguide according to claim 1, wherein the length of the second section is less than 10 cm.

12. A method of manufacturing a waveguide, the method comprising:
    forming a first section of the waveguide, the first section configured to broaden, by a non-linear optical process, a wavelength spectrum of pulsed radiation provided to an input end of the waveguide; and
    forming a second section of the waveguide, the second section comprising an output end of the waveguide and the second section configured to exhibit a larger absolute value of group velocity dispersion than the first section,
    wherein a length of the second section is between 0.5 cm and 20 cm and configured to reduce a peak intensity of one or more peaks in the broadened wavelength spectrum by at least 20%.

13. The method according to claim 12, wherein forming the first and second sections of the waveguide comprises:
    receiving a waveguide; and
    modifying a section of the waveguide comprising the output end of the waveguide.

14. The method according to claim 12, wherein forming the second section of the waveguide comprises attaching the second section to the first section.

15. The method according to claim 12, wherein the first and second sections of the waveguide comprise a plurality of anti-resonant elements surrounding a core, and wherein forming the second section comprises collapsing the plurality of anti-resonant elements in the second section.

16. The method according to claim 15, wherein collapsing the plurality of anti-resonant elements in the second section comprises:
    heating the second section; and
    elongating the second section by applying a pulling force.

17. The method according to claim 12, wherein the waveguide is a hollow-core photonic crystal fiber.

18. The method according to claim 12, wherein the waveguide is a solid core optical fiber.

19. The method according to claim 12, wherein the second section is configured to exhibit normal group velocity dispersion.

20. The method according to claim 12, wherein the length of the second section reduces a power of the broadened radiation spectrum by less than 6 dB.

* * * * *